US012767140B2

(12) United States Patent
Fayad et al.

(10) Patent No.: US 12,767,140 B2
(45) Date of Patent: Oct. 20, 2026

(54) METHOD FOR MANEUVERING A VEHICLE ON A MULTI-LANE ROAD TAKING INTO ACCOUNT BEHAVIOR OF A USER OF THE VEHICLE, DRIVER ASSISTANCE SYSTEM AND VEHICLE

(71) Applicant: Bayerische Motoren Werke Aktiengesellschaft, Munich (DE)

(72) Inventors: Sami Fayad, Munich (DE); Stephan Niermann, Hebertshausen (DE); Dominik Rieth, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 70 days.

(21) Appl. No.: 18/695,530

(22) PCT Filed: Sep. 1, 2022

(86) PCT No.: PCT/EP2022/074335
§ 371 (c)(1),
(2) Date: Mar. 26, 2024

(87) PCT Pub. No.: WO2023/057138
PCT Pub. Date: Apr. 13, 2023

(65) Prior Publication Data

US 2024/0400057 A1 Dec. 5, 2024

(30) Foreign Application Priority Data

Oct. 4, 2021 (DE) ..................... 10 2021 125 694.1

(51) Int. Cl.
*B60W 30/10* (2006.01)
*B60W 30/14* (2006.01)
(Continued)

(52) U.S. Cl.
CPC ...... *B60W 30/18163* (2013.01); *B60W 50/14* (2013.01); *B60W 2540/215* (2020.02); *B60W 2554/406* (2020.02); *B60W 2720/10* (2013.01)

(58) Field of Classification Search
CPC ........... B60W 30/18163; B60W 50/14; B60W 2540/215; B60W 2554/406;
(Continued)

(56) References Cited

U.S. PATENT DOCUMENTS

| | | | | |
|---|---|---|---|---|
| 2017/0018189 A1* | 1/2017 | Ishikawa | .............. | G05D 1/0088 |
| 2018/0043935 A1* | 2/2018 | Hashimoto | .......... | B62D 15/025 |

(Continued)

FOREIGN PATENT DOCUMENTS

| | | |
|---|---|---|
| DE | 10 2011 016 770 A1 | 11/2011 |
| DE | 10 2016 216 135 A1 | 3/2018 |
| WO | WO 2020/230306 A1 | 11/2020 |

OTHER PUBLICATIONS

International Search Report (PCT/ISA/210) issued in PCT Application No. PCT/EP2022/074335 dated Dec. 12, 2022 with English translation (7 pages).

(Continued)

*Primary Examiner* — Hossam M Abd El Latif
(74) *Attorney, Agent, or Firm* — Crowell & Moring LLP

(57) ABSTRACT

A method for maneuvering a vehicle on a multi-lane road has the steps of: receiving a driving command for maneuvering the vehicle from a second lane of the road, across a first lane of the road, to an exit of the road; preparing for a lane change maneuver from the second lane to the first lane, wherein, in order to prepare for the lane change maneuver, a speed of the vehicle is adjusted starting from an original first starting time before the exit is reached by the vehicle; checking whether the adjustment of the speed in order to prepare for the lane change maneuver of the vehicle starting (Continued)

from the first starting time is accepted by a user of the vehicle; and adjusting the first starting time for subsequent maneuvering of the vehicle on a multi-lane road on the basis of the check.

10 Claims, 3 Drawing Sheets

(51) Int. Cl.
*B60W 30/18* (2012.01)
*B60W 50/14* (2020.01)

(58) Field of Classification Search
CPC ......... B60W 2720/10; B60W 2540/30; B60W 30/10; B60W 30/143
USPC .............................................................. 701/1
See application file for complete search history.

(56) References Cited

U.S. PATENT DOCUMENTS

| | | | | |
|---|---|---|---|---|
| 2018/0281854 | A1* | 10/2018 | Talamonti | B62D 15/025 |
| 2019/0113930 | A1* | 4/2019 | Mimura | B60K 35/28 |
| 2019/0152525 | A1 | 5/2019 | Resch | |
| 2019/0225223 | A1* | 7/2019 | Feron | B60W 50/08 |
| 2021/0237739 | A1 | 8/2021 | Hayakawa et al. | |
| 2021/0300376 | A1 | 9/2021 | Hatano et al. | |
| 2021/0300377 | A1* | 9/2021 | Kanoh | B60W 30/0956 |
| 2022/0204054 | A1* | 6/2022 | Taniguchi | G08G 1/167 |

OTHER PUBLICATIONS

German-language Written Opinion (PCT/ISA/237) issued in PCT Application No. PCT/EP2022/074335 dated Dec. 12, 2022 with English translation (10 pages).
German-language Search Report issued in German Application No. 10 2021 125 694.1 dated Jun. 23, 2022 with partial English translation (11 pages).

* cited by examiner

METHOD FOR MANEUVERING A VEHICLE ON A MULTI-LANE ROAD TAKING INTO ACCOUNT BEHAVIOR OF A USER OF THE VEHICLE, DRIVER ASSISTANCE SYSTEM AND VEHICLE

BACKGROUND AND SUMMARY

The present invention relates to a method for maneuvering a vehicle on a multi-lane road. The present invention also relates to a driver assistance system. Finally, the present invention relates to a vehicle having such a driver assistance system.

Driver assistance systems for carrying out at least partially automated lane change maneuvers or so-called lane change assistance systems are known from the prior art. In the case of these driver assistance systems with an automated or automatic lane change function, the driver or user typically indicates a lane change by means of a certain operating action. If such an operating action is recognized, the vehicle is maneuvered along a planned trajectory to the adjacent lane or the target lane with automatic lateral guidance and generally also with automatic longitudinal guidance by means of the driver assistance system. In the case of such driver assistance systems, the driver's lane change request is usually signaled by actuating a corresponding operating element, for example a turn signal lever, for activating turn signals that are visible outside the vehicle.

Known driver assistance systems or lane change assistance systems generally monitor the environment of the vehicle by means of suitable environmental sensors before the lane change. In response to the driver's operating action, the lane can then be changed if a free gap for the driver's own vehicle has been identified in the adjacent lane or the target lane.

Driver assistance systems which assist the user of the vehicle on a multi-lane road upon reaching an exit are also known from the prior art. In this case, for example as a result of a navigation destination being input, the driver assistance system can prepare for all required lane changes until reaching the exit. For this purpose, the driver assistance system can first of all identify a free gap for the vehicle in the target lane and can then adjust the speed of the vehicle for the subsequent lane change into the identified gap. The lane change itself can be carried out by means of a lane change assistance system, wherein the lane change assistance system is triggered automatically or after an operating input by the user.

The driver assistance system which assists the user upon reaching the exit usually chooses the starting time for searching for a gap and therefore the potential beginning of the longitudinal control on the basis of various criteria. In this case, it is also known from the prior art that the adjustment of the speed of the vehicle or the longitudinal control can be repeatedly offered to the driver. Provision may also be made for the user to be able to override or violate the longitudinal control. If the user possibly repeatedly does not accept the adjustment of the longitudinal speed for preparing for the lane change, the function can be aborted.

The object of the present invention is to show a solution for how operation of a driver assistance system of the type mentioned at the outset can be adjusted to the behavior of the user or the driver. In addition, the intention is to provide a vehicle having a corresponding driver assistance system.

This object is achieved, according to the invention, by means of a method, by means of a driver assistance system and by means of a vehicle having the features according to the independent claims. Advantageous developments of the present invention are specified in the dependent claims.

A method according to the invention is used to maneuver a vehicle on a multi-lane road. The method comprises receiving a driving command for maneuvering the vehicle from a second lane of the road, across a first lane of the road, to an exit of the road. The method also comprises preparing for a lane change maneuver from the second lane to the first lane, wherein, in order to prepare for the lane change maneuver, a speed of the vehicle is adjusted starting from an original first starting time before the exit is reached by the vehicle. The method also comprises checking whether the adjustment of the speed in order to prepare for the lane change maneuver of the vehicle starting from the first starting time is accepted by a user of the vehicle, and adjusting the first starting time for subsequent maneuvering of the vehicle on a multi-lane road on the basis of the check.

The method is intended to be used to assist a driver or the user of the vehicle when maneuvering the vehicle on the multi-lane road. The multi-lane road may be, in principle, a highway, a federal highway, a freeway, an expressway-like road or the like. However, the road is preferably an expressway. The road may have, for example, two carriageways each with at least two lanes which are referred to in the present case as the first lane and second lane. Both the driver's own vehicle and further road users may move in a predefined direction of travel in these lanes. The road may have at least one first lane and one second lane. In this case, the first lane may be adjacent to the exit or a deceleration lane which leads to the exit. The first lane may be, for example, the right-hand lane of an expressway.

The driver assistance system is used to receive the driving command which describes the fact that the vehicle is intended to be maneuvered from the second lane, across the first lane, to the exit of the road. In other words, a lane change from the second lane to the first lane is first of all intended to be carried out and the vehicle is then intended to leave the road via the exit. In this case, the driving command can be predefined by route guidance or a navigation system of the vehicle. Alternatively or additionally, the driving command may be due to a corresponding operating input by the driver.

Furthermore, the driver assistance system can be used to prepare for the lane change from the second lane to the first lane. For this purpose, corresponding distance sensors or environmental sensors of the driver assistance system can first of all be used to search for free gaps for the vehicle in the first lane. In addition, the driver assistance system can be used to adjust the speed of the vehicle or the longitudinal speed. In particular, the speed of the driver's own vehicle can be reduced or can be adjusted to the speed of the further road users in the target lane or the first lane. For example, the speed of the vehicle can be adjusted in such a manner that a gap in the target lane is pursued. The at least partially automated lane change maneuver can then be carried out by means of a lane change assistant. Depending on the country-specific specification, the lane change assistant can be initiated automatically by the driver assistance system or on account of an operating input by the user. In the second case, the advice "Trigger lane change in order to follow route" can be output to the user when level with the gap, for example.

In principle, an appropriate strategy may therefore be predefined for initiating the automated lane change maneuver. In the present case, this strategy describes the time from which or the distance to the exit from which the speed of the vehicle is adjusted. In this case, provision is made, in principle, for the speed to be initially adjusted at the original first starting time before reaching the exit. This first starting time may be selected on the basis of the speed of the vehicle therefore describes that distance between the vehicle and the exit from which the reduction in the speed is started. In addition, the strategy can describe the time from which or the distance to the exit from which the search for a gap is started. In addition, the strategy can describe the output of corresponding advice to the driver.

The present invention now provides for a check to be carried out in order to determine whether the adjustment of the speed in order to prepare for the lane change maneuver of the vehicle starting from the first starting time is accepted by the user of the vehicle. If the user of the vehicle does not agree with this adjustment of the speed, the user can actuate the accelerator pedal or another operating element, for example, in order to accelerate the vehicle. In other words, the user can violate the adjustment of the longitudinal speed. In addition, provision is made for the original first starting time to be adjusted for subsequent maneuvering of the vehicle on a multi-lane road on the basis of this check.

The function or driver assistance function therefore reacts to the violation and rejects the currently found gap. If the search for the free gap generally begins too early for the user and/or the user does not place any importance on comfortable control, for example, the function according to the prior art will not generally start the longitudinal control later in the case of frequent violation. This may result, for example, in the user not using the driver assistance function any further or switching it off. In contrast, the present invention provides for the user's acceptance of the adjustment of the speed to be taken into account for subsequent driving maneuvers or subsequent maneuvering of the vehicle. In the present case, the term "subsequent maneuvering" should be understood as meaning, in particular, a driving maneuver which follows the current driving maneuver in terms of time and during which a lane change maneuver from the second lane to the first lane is prepared for and the speed of the driver's own vehicle is adjusted for this purpose. If the adjustment or reduction in the speed starting from the original first starting time is now frequently not accepted or violated by the driver, for example, this first starting time can be adjusted or postponed in terms of time for the subsequent maneuvering of the vehicle. The driver assistance function can therefore be adjusted to the behavior of the user or driver.

If the user has not accepted the adjustment of the speed, a lane change maneuver starting from a second starting time is preferably prepared for, a check is carried out in order to determine whether the user accepts the preparation for the lane change maneuver starting from the second starting time, and the first starting time for subsequent maneuvering is additionally adjusted on the basis of this check. Provision may therefore be made for further lane change maneuvers to be offered to the user if the user has not accepted the preparation for the lane change maneuver at the first starting time. For example, provision may be made for the driver to be able to violate the longitudinal control up to twice and for the driver assistance function to then be terminated. In the present case, a check is therefore also carried out in order to determine whether the user accepts the subsequent lane change maneuvers or the preparations for the subsequent lane change maneuvers from the second lane to the first lane. If the user does not accept the adjustment of the speed for the lane change maneuver at the second starting time either, for example, the first starting time for subsequent maneuvering of the vehicle can be postponed further. The driver assistance function can therefore be continuously adjusted to the behavior of the user and the acceptance of the function can therefore be improved.

It is also advantageous if the first starting time is adjusted in a range between an initial value and a minimum starting time. In this case, the first starting time or the initial value may be predefined or stored in the system. In this case, the first starting time for the subsequent maneuvering of the vehicle on the multi-lane road can be adjusted between this originally stipulated starting time and a predetermined minimum starting time. In this case, the minimum starting time can be selected, for example, in such a manner that it can still be possible to safely reach the exit. This makes it possible to prevent the exit from not being able to be reached, for example.

In a further embodiment, the first starting time is additionally adjusted on the basis of a known driving behavior of the driver. In this case, the driving behavior of the user can describe, for example, whether the user acts in a more sporty or more comfortable or reticent manner during manual driving of the vehicle. This driving behavior can be captured in a known manner during manual operation of the vehicle by the user. In this case, provision is now made for the strategy for initiating the automated lane change maneuver to be additionally adjusted to the driving behavior of the user. In the case of a more sporty driver, the first starting time can therefore be postponed further or selected at a later time, for example. In comparison, in the case of a careful driver, the automated lane change maneuver can fundamentally be initiated earlier.

In addition, it is possible to check whether a lane change maneuver is manually carried out by the user before a lane change by the driver assistance system is provided. For example, the lane change can be already carried out by the user before the first starting time or the initial value for the first starting time. If the lane change maneuver is carried out early by the user himself, the preparation for the lane change maneuver of the vehicle starting from the first starting time is therefore not accepted by the user either. The system can therefore learn virtually in the other direction, in particular in the case of a careful user. In this case, the first starting time can be moved forward or can take place earlier during subsequent maneuvering of the vehicle on a multi-lane road. This makes it possible to adjust the operation of the driver assistance system to the driving behavior of the user. In this case, the driver assistance system can also use different settings for different users. The data can therefore be stored in a user-specific or driver-specific manner.

In a further configuration, it is determined when the exit is reached by the vehicle, and the first starting time is additionally adjusted on the basis of whether the vehicle has reached the exit or has driven past the exit. If, for example, the first starting time has been postponed to a relatively great extent on account of the driving behavior of the driver, it may be the case, in particular when there is a high traffic density, that the vehicle has not reached the exit. It may also be provided that the lane change maneuver from the second lane to the first lane could not be carried out in good time. Advice indicating that an automated lane change maneuver cannot be carried out and the lane change maneuver should be manually carried out by the driver can be output here to the driver in advance, for example.

The aspect whereby the vehicle has driven past the originally planned exit can be monitored, for example, by replanning or recalculating the navigation route by means of the navigation system. In this case, it is possible to take into account, for example, whether the distance for the route and/or the time until the destination is reached has changed. If it has been identified, for example, that the vehicle has driven past the exit, the first starting time can be preferred for the subsequent maneuver.

In a further embodiment, a current traffic density on the road is determined, and the first starting time is additionally adjusted on the basis of the traffic density. A traffic density on the road or in the first lane of the road can be determined on the basis of data from the environmental sensors of the driver assistance system and/or on the basis of traffic data. In particular, it is possible to determine the traffic density in a region of the exit or in a region before the exit. Provision may also be made for the presence of trucks or a number of trucks in an environment of the vehicle to be determined. This information relating to the trucks can also be determined on the basis of the data from the environmental sensors. In this case, provision may also be made for the first starting time for initiating the lane change maneuver from the second lane to the first lane to be adjusted on the basis of the current traffic situation, in particular the traffic density and/or the presence of trucks. In other words, the current traffic situation can be determined for each driving maneuver or each lane change maneuver and the first starting time can be adjusted to this traffic situation.

In a further configuration, before the lane change maneuver from the second lane to the first lane, a lane change maneuver from a third lane of the road to the second lane is carried out. In other words, the driver assistance system can preferably be designed to initiate all necessary lane change maneuvers before leaving the exit so that the exit can be reliably and safely reached by the vehicle. The method or the driver assistance system can therefore be used for a multi-lane road with more than two lanes. A lane change maneuver can also be initially prepared for at a first starting time for the lane change from the third lane to the second lane. In this case, the respective starting times for preparing for the lane change maneuvers between the respective lanes can be adjusted to the driving behavior of the driver. In addition, the respective first starting times can be adjusted to the number of lane change maneuvers before reaching the exit and/or the current traffic situation.

A driver assistance system according to the invention or an assistance system for a vehicle is configured to carry out a method according to the invention and the advantageous configurations thereof. The driver assistance system may have at least one environmental sensor which can be used to detect the further road users in the environment of the vehicle and, in particular, in the adjacent lane. In addition, the driver assistance system or a corresponding computing device of the driver assistance system can identify free gaps between further road users on the basis of the data from the at least one environmental sensor. This computing device may be formed by at least one electronic control unit of the vehicle. In principle, the computing device may have at least one processor and a memory. A strategy for initiating the automated driving maneuver may then also be adjusted or the original starting time may be adjusted by means of the computing device.

Furthermore, the longitudinal guidance for preparing for the lane change maneuver is adjusted by means of the driver assistance system. For this purpose, appropriate control signals can be emitted by means of the computing device. In addition, the trajectory for maneuvering the vehicle or for the automated lane change maneuver can be calculated by means of the computing device or the driver assistance system. In addition, the computing device may be designed to control steering or a steering system of the vehicle. This control of the steering makes it possible to undertake the lateral guidance of the vehicle during the lane change maneuver. Provision may also be made for the longitudinal guidance of the vehicle during the lane change maneuver to be undertaken by means of the driver assistance system.

A vehicle according to the invention comprises a driver assistance system according to the invention. The vehicle may be, in particular, in the form of an automobile.

The preferred embodiments and their advantages presented with respect to the method according to the invention accordingly apply to the driver assistance system according to the invention and the vehicle according to the invention.

Further features of the invention emerge from the claims, the figures and the description of the figures. The features and combinations of features mentioned in the description above and the features and combinations of features mentioned in the description of the figures below and/or shown in the figures alone can be used not only in the respectively stated combination, but also in other combinations or alone, without departing from the scope of the invention.

The invention is now explained in more detail on the basis of preferred exemplary embodiments and with reference to the accompanying drawings.

BRIEF DESCRIPTION OF THE DRAWINGS

In the figures, identical or functionally identical elements are provided with the same reference signs.

DETAILED DESCRIPTION OF THE DRAWINGS

Figure 1:
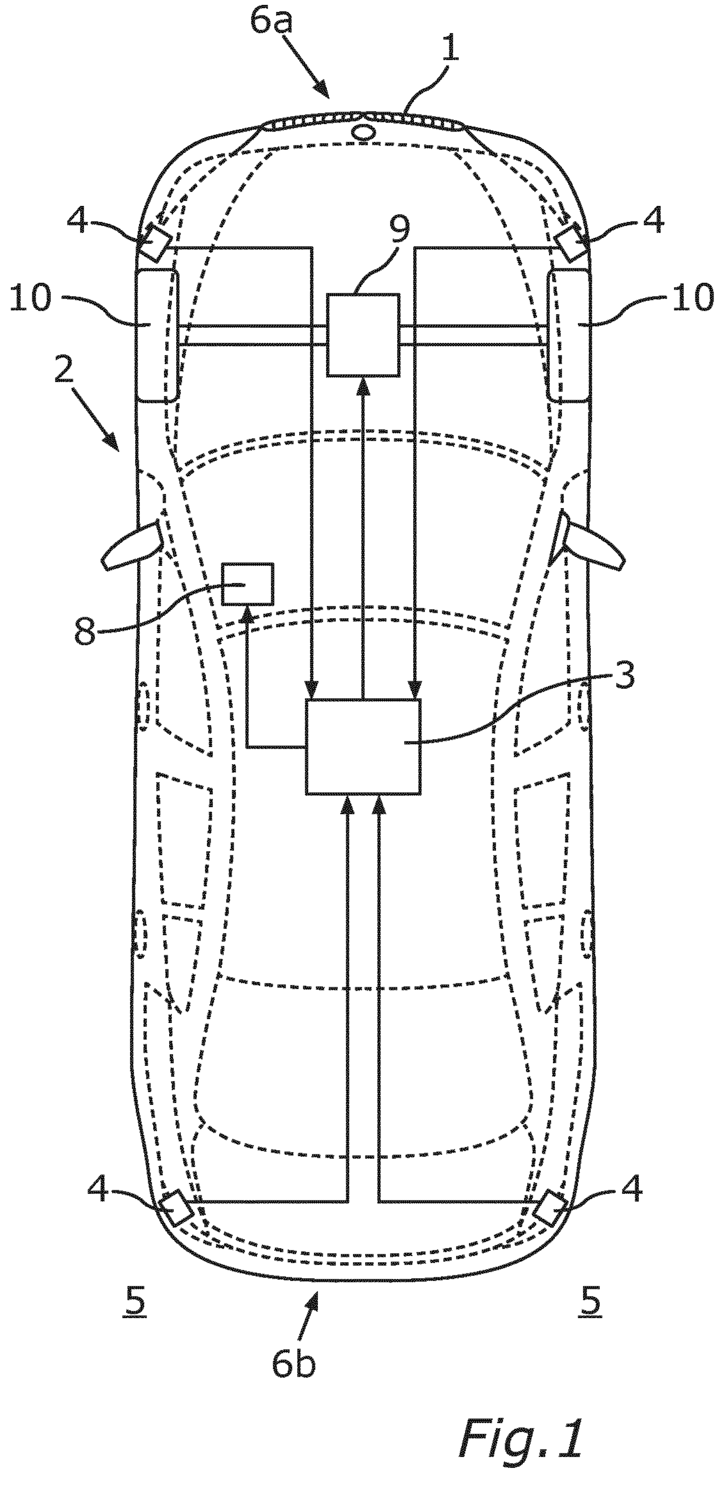
FIG. 1 is a schematic illustration of a vehicle which has a driver assistance system for maneuvering a vehicle on a multi-lane road.

FIG. 1 shows a plan view of a vehicle 1 which is in the form of an automobile in the present case. The vehicle 1 comprises a driver assistance system 2 which can be used to assist a user or driver when maneuvering the vehicle 1 on a multi-lane road 11. The vehicle 1 or the driver assistance system 2 comprises a computing device 3 which may comprise at least one electronic control unit, for example. In particular, the computing device 3 may have at least one processor and a memory.

In addition, the driver assistance system 2 comprises at least one environmental sensor 4. In the present example, the driver assistance system 2 comprises four environmental sensors 4, two environmental sensors 4 of which are arranged in a front region **6*a* and two environmental sensors 4 of which are arranged in a rear region 6*b* of the vehicle 1. In this case, the environmental sensors 4 or distance sensors are arranged at the respective corners of the vehicle 1. The environmental sensors 4 may be in the form of radar sensors, for example. The environmental sensors 4 can be used to carry out corresponding measurements in order to be able to detect objects and, in particular, further road users 7 in an environment 5 of the vehicle 1**.

A drive motor and/or a brake system of the vehicle 1 can be controlled by means of the computing device 3 in order to influence longitudinal guidance of the vehicle 1. This makes it possible to prepare for lane change maneuvers by reducing the speed of the vehicle 1. Provision is also made for the computing device 3 to be configured to control a steering system 9 of the vehicle 1 that is illustrated only schematically in the present case. Controlling the steering system 9 makes it possible to undertake the lateral guidance of the vehicle 1 during an automated lane change maneuver. Controlling the steering system 9 makes it possible to steer steerable wheels 10 of the vehicle 1 and therefore to undertake the lateral guidance during the lane change maneuver. The driver assistance system 2 also comprises an output device 8 which can be used to output advice to the user or driver of the vehicle 1.

Figure 2:
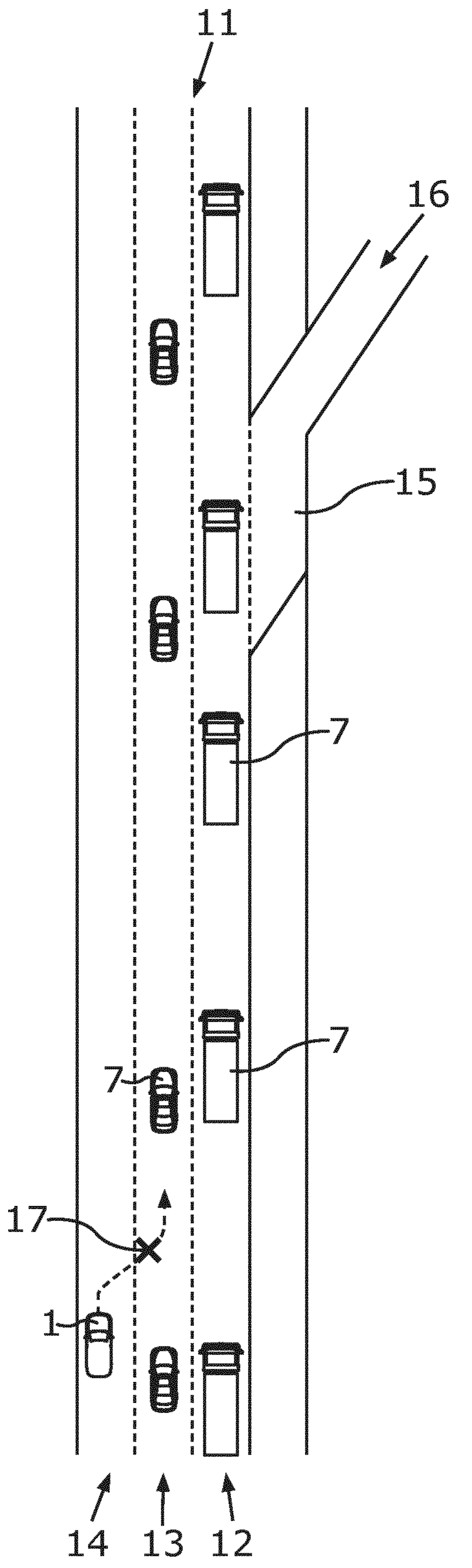
FIG. 2 illustrates the vehicle according to FIG. 1 in a traffic situation, wherein the vehicle is on a multi-lane road and a driving maneuver from a second lane of the road to an exit of the road is planned.

FIG. 2 shows a schematic illustration of a traffic situation in which the vehicle 1 according to FIG. 1 is on a multi-lane road 11. In the present example, the road 11 is in the form of an expressway. In this case, the road 11 comprises a first lane 12 or a right-hand lane, a second lane 13 or a middle lane and a third Lane 14 or a left-hand lane. In the present case, the vehicle 1 is in the third lane 14 or the left-hand lane of the expressway. In this case, the vehicle 1 is intended to be initially maneuvered from the third lane 14 to the second lane 13, then to the first lane 12 and then, across a deceleration lane 15, to an exit 16 of the road 11. The vehicle 1 can therefore follow a predefined navigation route, for example.

Provision is also made for automated lane change maneuvers from the third lane 14 to the second lane 13, from the second lane 13 to the first lane 12 and from the first lane 12 to the deceleration lane 15 to be initially prepared for and then carried out by means of the driver assistance system 2. The respective lane change maneuvers are initiated or prepared for on the basis of a predefined strategy. In the present case, this strategy establishes the starting time from which the longitudinal speed of the vehicle 1 is adjusted for the subsequent lane change maneuver until the exit 16 is reached by the vehicle 1.

In the present case, the lane change maneuver from the third lane 14 to the second lane 13 is started starting from an original first starting time and the speed of the vehicle 1 is reduced for this purpose. For example, the vehicle 1 may be at a distance of 2.1 km from the exit 16 at the first starting time. In the present case, it is assumed that the driver or user of the vehicle 1 does not accept the reduction in the speed and violates it. Therefore, the lane change is not carried out at the first starting time either. This is schematically illustrated in the present case by the cross 17.

Figure 3:
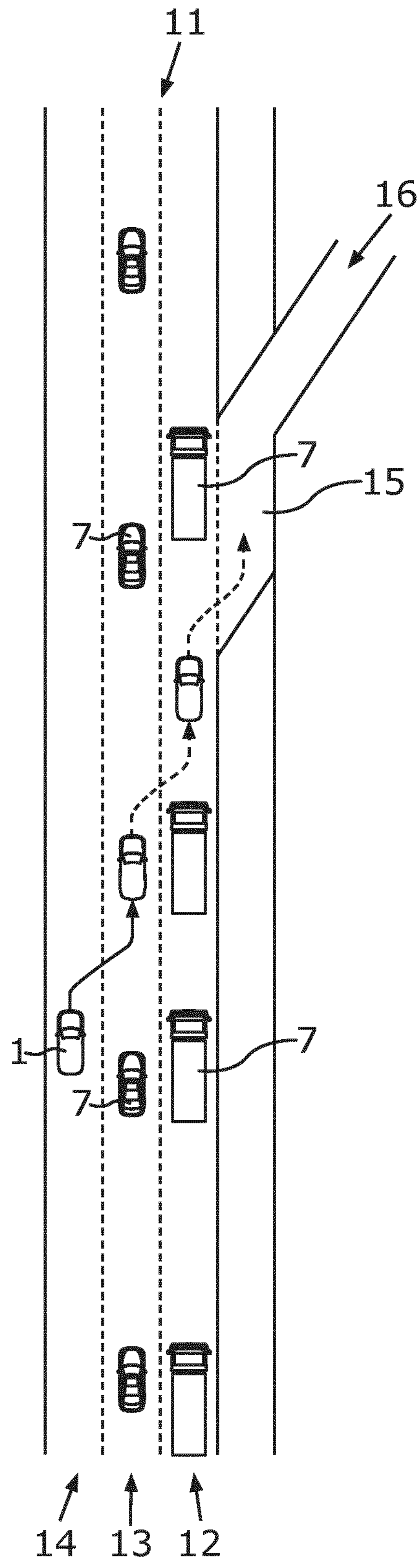
FIG. 3 illustrates the driving situation according to FIG. 2 at a later time.

FIG. 3 shows the traffic situation according to FIG. 2 at a later time. In this case, preparations are made at a second starting time at which the vehicle 1, for example, is at a distance of 1.8 km from the exit 16. In this case, the reduction in the speed of the vehicle 1 in order to prepare for the lane change maneuver is accepted by the driver. The respective lane change maneuvers from the third lane 14 to the deceleration lane 15 are then carried out by means of the driver assistance system 2.

In this case, the exit 16 was reached by the vehicle 1. However, since the user did not accept the preparation for the lane change maneuver at the first starting time—as illustrated in FIG. 2—the characteristic diagrams for determining the first search for a gap can be adjusted. This makes it possible to adjust the first starting time for maneuvering the vehicle 1 to a later time. In particular, the reactions of the user to the preparation for the lane change maneuvers can be continuously captured and the first starting time can be continuously adjusted.

For example, a factor ci can be determined according to the following formula:

$$c_i = \frac{t_{ni} - t_s}{t_n - t_s},$$

where $t_n$ describes the original first starting time, $t_{ni}$ describes the new or changed first starting time and $t_s$ describes the latest possible starting time. In this case, scaling between the original value or the original first starting time and the stipulated minimum value $t_s$ is possible. A filtered factor $c_f$ can then be determined on the basis of the respectively determined factors:

$$c_f = F(c_1, \ldots c_n).$$

In principle, however, provision is made for the first starting time or the respective starting times for preparing for the respective lane change maneuvers to be determined on the basis of a traffic density and the number of required lane changes.

What is claimed is:

1. A method for maneuvering a vehicle on a multi-lane road, comprising:

receiving a driving command for maneuvering the vehicle from a second lane of the road, across a first lane of the road, to an exit of the road;

adjusting a speed of the vehicle at a predetermined initial start time before the exit is reached by the vehicle and in preparation for maneuvering the vehicle from the second lane to the first lane via a first lane change maneuver;

checking whether the speed adjustment at the initial start time is accepted by a user of the vehicle;

adjusting the initial start time to an adjusted initial start time for a subsequent maneuvering of the vehicle on the multi-lane road or another multi-lane road based on the check of whether the speed adjustment at the initial start time is accepted; and in response to the user not accepting the speed adjustment, adjusting the speed of the vehicle at a delayed start time in preparation for the maneuvering of the vehicle from the second lane to the first lane via a second lane change maneuver.

2. The method of claim 1, further comprising:

checking whether the user accepts the speed adjustment at the delayed start time, and adjusting the initial start time for the subsequent maneuvering based on the check of whether the speed adjustment at the second starting time is accepted.

3. The method of claim 1, wherein the initial start time is adjusted in a range between an initial value and a minimum starting time.

4. The method of claim 1, wherein the initial start time is additionally adjusted based on a known driving behavior of the user.

5. The method of claim 1, further comprising:

determining when the exit is reached by the vehicle, wherein the adjustment of the initial start time is further based on whether the vehicle has reached the exit or has driven past the exit.

6. The method of claim 1, further comprising:

determining a current traffic density on the road, wherein the adjustment of the first starting time is further based on the determined current traffic density.

7. The method of claim 1, wherein before the first lane change maneuver from the second lane to the first lane, a preliminary lane change maneuver from a third lane of the road to the second lane is prepared for.

8. A system for a vehicle, comprising:

a computer-implemented driver assistance system configured to:

receive a driving command for maneuvering the vehicle from a second lane of the road, across a first lane of the road, to an exit of the road, adjust a speed of the vehicle at a predetermined initial start time before the exit is reached by the vehicle and in preparation for maneuvering the vehicle from the second lane to the first lane via a first lane change maneuver, check whether the speed adjustment at the initial start time is accepted by a user of the vehicle, adjust the initial start time for a subsequent maneuvering of the vehicle on the multi-lane road or another multi-lane road based on the check of whether the speed adjustment at the first starting time is accepted; and in response to the user not accepting the speed adjustment, adjust the speed of the vehicle at a delayed start time in preparation for the maneuvering of the vehicle from the second lane to the first lane via a second lane change maneuver.

9. A vehicle comprising a system of claim 8.

10. The vehicle of claim 9, wherein the vehicle is a passenger motor car.

* * * * *